(12) United States Patent
Lee et al.

(10) Patent No.: US 11,762,471 B2
(45) Date of Patent: Sep. 19, 2023

(54) ACTUATOR CONTROL DEVICE AND METHOD

(71) Applicant: DONGWOON ANATECH CO., LTD., Seoul (KR)

(72) Inventors: Su Yeol Lee, Seoul (KR); Cheol Hoei Kim, Seoul (KR); Kyoung Rok Lee, Seoul (KR)

(73) Assignee: DONGWOON ANATECH CO., LTD., Seoul (KR)

( * ) Notice: Subject to any disclaimer, the term of this patent is extended or adjusted under 35 U.S.C. 154(b) by 485 days.

(21) Appl. No.: 17/255,939

(22) PCT Filed: Jun. 14, 2019

(86) PCT No.: PCT/KR2019/007176
§ 371 (c)(1),
(2) Date: Dec. 23, 2020

(87) PCT Pub. No.: WO2020/004841
PCT Pub. Date: Jan. 2, 2020

(65) Prior Publication Data
US 2021/0263590 A1 Aug. 26, 2021

(30) Foreign Application Priority Data
Jun. 28, 2018 (KR) .................. 10-2018-0074699

(51) Int. Cl.
*G06F 3/01* (2006.01)
*B06B 1/02* (2006.01)

(52) U.S. Cl.
CPC ............ *G06F 3/016* (2013.01); *B06B 1/0246* (2013.01)

(58) Field of Classification Search
CPC ... G06F 3/016; B06B 1/0246; B06B 2201/70; B06B 1/0253
(Continued)

(56) References Cited

U.S. PATENT DOCUMENTS

| | | | | |
|---|---|---|---|---|
| 2010/0153845 A1* | 6/2010 | Gregorio | ................. | G06F 3/016 715/702 |
| 2014/0118126 A1* | 5/2014 | Garg | ....................... | G06F 3/016 340/407.1 |

FOREIGN PATENT DOCUMENTS

| | | |
|---|---|---|
| JP | 3004094 U | 11/1994 |
| JP | 2008-029081 A | 2/2008 |

(Continued)

OTHER PUBLICATIONS

Japanese Notice of Allowance dated Aug. 12, 2022, issued to Japanese Application No. 2020-572432.

*Primary Examiner* — Toan N Pham
*Assistant Examiner* — Mancil Littlejohn, Jr.
(74) *Attorney, Agent, or Firm* — Stein IP, LLC

(57) ABSTRACT

The present invention relates to a haptic feedback system and, particularly, to a device and a method for controlling an actuator for haptic feedback, the method comprising: a first step of controlling the output of an oscillator such that a clock necessary in the generation of a driving signal for driving an actuator is oscillated at a reference clock frequency; a second step of calculating the resonance frequency of the actuator from a cycle of a BEMF signal according to the driving of the actuator; and a third step of calculating a clock frequency for following the calculated resonance frequency of the actuator so as to newly change and set same to the reference clock frequency, thereby controlling the output of the oscillator.

14 Claims, 9 Drawing Sheets

(58) Field of Classification Search
USPC .................................................... 340/407.1
See application file for complete search history.

(56) References Cited

FOREIGN PATENT DOCUMENTS

| JP | 2014-509026 A | 4/2014 |
|----|---------------|--------|
| JP | 2017-532648 A | 11/2017 |
| KR | 10-2013-0089211 A | 8/2013 |
| KR | 10-1703472 B1 | 2/2017 |
| KR | 10-2017-0032452 A | 3/2017 |
| KR | 10-1799722 B1 | 11/2017 |

* cited by examiner

ACTUATOR CONTROL DEVICE AND METHOD

CROSS-REFERENCE TO RELATED APPLICATIONS

This application is a national stage of International Application No. PCT/KR2019/007176, filed Jun. 14, 2019, which claims the benefit of Korean Application No. 10-2018-0074699, filed Jun. 28, 2018, in the Korean Intellectual Property Office, the disclosures of which are incorporated herein by reference.

TECHNICAL FIELD

The present invention relates to a haptic feedback system, and more particularly, to a device and method for controlling an actuator for haptic feedback.

BACKGROUND ART OF THE INVENTION

A haptic feedback system is mounted and used in various devices for a user interface. For example, haptic feedback is provided to a user through vibration from a touch screen, a softkey, a home button, and a fingerprint recognition sensor of a portable device. Recently, a vibration feedback system has also been installed in many devices including touch screens such as automobiles and home appliances.

A linear Resonance Actuator (LRA) is used as a means of generating vibration in a haptic feedback system. The linear resonance actuator has characteristics in that a maximum vibration with optimum power efficiency can be obtained only when it is driven at the resonance frequency ($f_0$).

The resonance frequency of the linear resonance actuator can vary with manufacturing tolerances, mounting conditions, temperature, and aging. In addition, when driving outside the resonance frequency, the vibration force may be weakened or vibration may not occur. Therefore, in order to obtain maximum acceleration with a small driving time in general vibration such as an alert vibration, it must be operated at the resonance frequency of the actuator. To this end, it is necessary to correct in real time the resonance frequency of the actuator, which can be varied according to manufacturing tolerances, mounting conditions, temperature, and aging.

In addition, in recent years, instead of removing a physical button for waterproof function and screen expansion of a portable device, a touch button is used, and vibration feedback is also used to implement a click feeling like a physical button in a touch button. In this case, vibration feedback is generated with an acceleration of 1G or more in a short driving time of 10 ms to 20 ms, and after the actuator stops driving, the smaller the residual vibration, the more a click feel like pressing a physical button is reproduced.

In general, to reduce the residual vibration of the actuator, it detects the zero cross point of the back electro motive force (BEMF) signal and the magnitude of the BEMF signal and automatically generates and controls the brake signal, but when the driving time is very short or the magnitude of the BEMF signal is small, it is difficult to generate an effective waveform of the brake signal that can reduce residual vibration of the actuator. Therefore, there is a need for an effective method to minimize the magnitude of the residual vibration and the residual vibration time of the actuator in a haptic feedback system.

PRIOR ART LITERATURE

Patent Literature (Patent Literature 1) Korean Registered Patent Publication No. 10-1799722
(Patent Literature 2) Korean Registered Patent Publication No. 10-1703472

SUMMARY OF INVENTION

Technical Problems

Accordingly, the present invention is an invention devised in accordance with the above-described necessity, and an objective of the present invention is to provide a control device and a control method for a linear resonance actuator capable of correcting the resonance frequency of the actuator that is varied according to manufacturing tolerances, mounting conditions, temperature, and aging in real time, thereby obtaining a maximum vibration with optimal power efficiency.

Further, another objective of the present invention is to provide a control device and a control method for a linear resonance actuator capable of tracking drive signal waveforms that generate vibrations of various feelings according to the resonance frequency.

Yet another objective of the present invention is to provide a control device and a control method for an actuator capable of controlling an actuator to obtain a click feeling as if a physical button was manipulated even though a touch button is manipulated.

Furthermore, another objective of the present invention is to provide a control device and a control method of a linear resonance actuator that measures and corrects the resonance frequency of the actuator that changes according to manufacturing tolerances, mounting conditions, temperature, and aging when certain event conditions are satisfied, and thereby continuously maintain the maximum vibration with optimal power efficiency, and further, yet another objective of the present invention is to correct the resonant frequency of an actuator to continuously maintain the maximum magnitude of vibration with optimum power efficiency according to the period of use of the device, but in particular, it is intended to provide a control device and a control method of an actuator for correcting the resonant frequency of the actuator by changing the internal clock frequency.

Technical Solution

An actuator control device according to an embodiment of the present invention for solving the above technical problem is characterized by comprising:

a resonance frequency correction unit that outputs a PWM pulse which is generated according to the combination of: a clock oscillated at a reference clock frequency, and a reference driving signal waveform data for driving the actuator, to an actuator drive unit; and a zero cross point detection unit for detecting a zero cross point of a BEMF signal according to driving of the actuator, wherein the resonance frequency correction unit is characterized by performing an automatic correction process by calculating the resonance frequency of the actuator from the detection cycle of the zero cross point so as to newly change and set a clock frequency for following the calculated resonance frequency of the actuator to the reference clock frequency.

An actuator control device according to another embodiment of the present invention is characterized by further comprising the BEMF amplification unit located at a front end of the zero cross point detection unit to amplify a BEMF signal.

Meanwhile, in each of the above-described actuator control devices, the resonance frequency correction unit is characterized by comprising:

a counter for counting a detection cycle of the zero cross point with an internal clock;

a clock frequency control unit for calculating a resonance frequency of the actuator from a counting value of the counter, calculating a clock frequency for following the calculated resonance frequency of the actuator, changing and setting it to a new reference clock frequency, and controlling an output clock of an oscillator;

an oscillator for oscillating at a clock frequency set by the control of the clock frequency control unit; and a PWM generation unit for generating a PWM pulse according to a combination of: a clock of the oscillator, and the waveform data of the driving signal applied from the outside, wherein the clock frequency control unit is characterized by performing the automatic correction process when a predetermined event condition is satisfied, and furthermore, the clock frequency control unit is characterized by performing the automatic correction process when a predetermined event condition is satisfied, by applying a first driving signal waveform data for correction having a relatively large driving voltage and a shorter driving time than the reference driving signal waveform data, or a second driving signal waveform data for correction having a relatively small driving voltage and a longer driving time than the reference driving signal waveform data, to the PWM generation unit.

Meanwhile, an actuator control method according to an embodiment of the present invention, which is a control method for driving an actuator constituting a heptic feedback system at a resonance frequency, is characterized by comprising:

a first step of controlling an output of an oscillator so that a clock required to generate a driving signal for driving the actuator is oscillated at a reference clock frequency;

a second step of calculating the resonance frequency of the actuator from the cycle of the BEMF signal according to the driving of the actuator; and a third step of controlling the output of the oscillator by calculating a clock frequency for following the calculated resonance frequency of the actuator and newly changing and setting it to the reference clock frequency, and it is characterized in that the second and third steps are performed when the device is powered on or at a predetermined correction cycle or when a set temperature inside the device is reached, but to further include a step of changing driving signal waveform data so as to generate a first driving signal for correction having a relatively larger driving voltage and shorter driving time than the driving signal or a second driving signal for correction having a relatively small driving voltage and a longer driving time than the driving signal.

Advantageous Effects of Invention

According to the above-described problem solving means, the present invention has an advantage capable of providing maximum vibration with optimum power efficiency for haptic feedback system by correcting the resonance frequency of the actuator, which is being changed according to manufacturing tolerances, mounting conditions, temperature, and aging, when certain event conditions are satisfied through correction of the reference clock frequency.

Furthermore, the present invention drives the actuator with an initial drive signal waveform, and since it tracks the resonance frequency of the actuator in a way that the length of the driving time interval of the next cycle is corrected according to the detection time of the zero cross point of the BEMF signal in the guard time interval constituting the drive signal, there is an advantage that the maximum vibration can be obtained with optimal power efficiency by correcting the resonance frequency of the actuator that is varied with the manufacturing tolerances, mounting conditions, temperature, and aging, in real time.

In addition, since the present invention adjusts and uses a frequency after storing a drive signal waveform data, it is possible to implement vibrations of various feelings by driving various waveforms at a resonance frequency, and the effect of adjusting the maximum acceleration and minimizing the dispersion of the actuator acceleration can also be obtained by optimizing the drive signal waveform data stored in the memory.

Also, after finding a brake signal waveform optimized for the actuator by an experimental method and storing it in a memory, then by applying a brake signal in a direction that interferes with residual vibration to coincide with the zero cross point detected in the interval after the actuator is driven, there is an advantage that residual vibration can be stably removed even in the case of a waveform with a short driving time or a small size of a BEMF signal like a home button.

DETAILED DESCRIPTION OF EMBODIMENTS

Hereinafter, preferred embodiments of the present invention will be described in detail with reference to the accompanying drawings. In describing the present invention, when it is determined that a detailed description such as a related known function or configuration may unnecessarily obscure the gist of the present invention, a detailed description thereof will be omitted. For example, the actuator control device according to the embodiment of the present invention is applicable to a haptic feedback system, and it is assumed that the device to which the present invention can be applied includes a touch-sensitive surface or other type of interface, and the actuator, and it is assumed that vibration by the actuator is generated on the touch surface.

Meanwhile, among terms used below, the term 'drive waveform' refers to a waveform applied to the actuator during a driving time interval constituting a drive signal, and it can be interpreted in a way that adjusting the length of the driving time interval means a change in the driving waveform.

Figure 1:
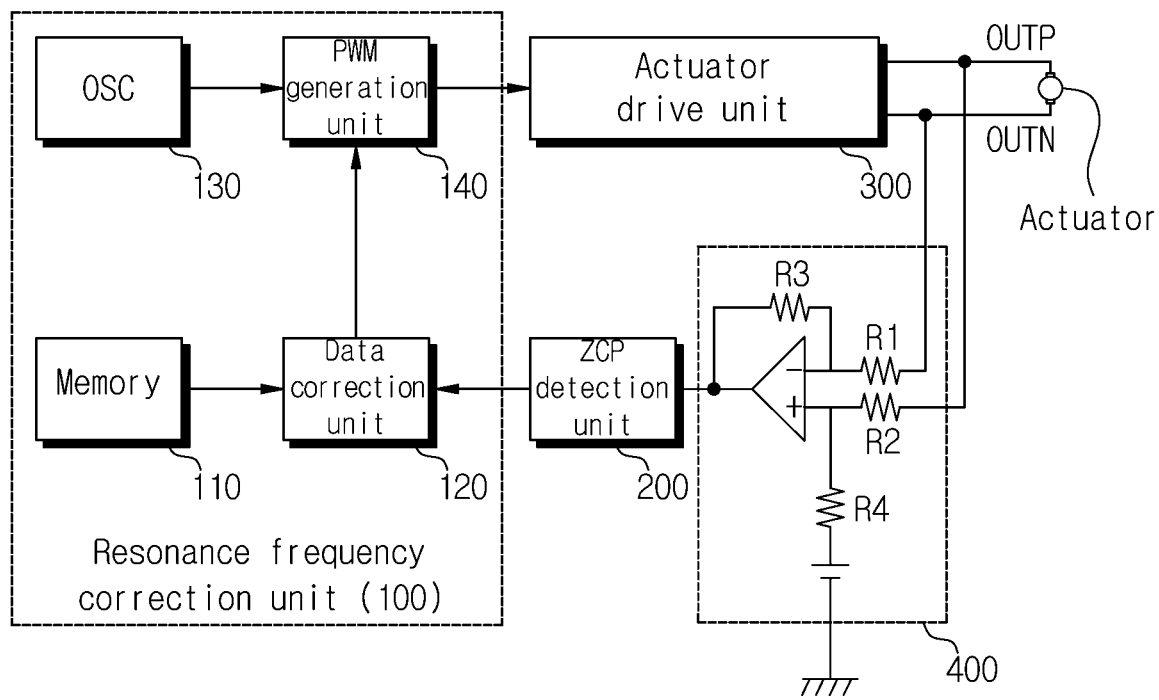
FIG. 1 is an exemplary block diagram of an actuator control device according to an embodiment of the present invention.

First, FIG. 1 is an exemplary block diagram of an actuator control device according to an embodiment of the present invention.

As illustrated in FIG. 1, the haptic feedback system includes an actuator having a resonance frequency as a means for generating vibration on the touch surface, for an example, and an actuator drive unit 300 for driving the actuator according to a drive signal generated by a resonance frequency correction unit 100, which will be described later. Since the actuator drive unit 300 includes a gate driver and an H-bridge circuit as already known to public, a detailed description thereof will be omitted.

Referring to FIG. 1, the actuator control device according to the embodiment of the present invention comprises: a zero cross point detection unit 200 for detecting a zero cross point (hereinafter referred to as ZCP) of a back electro motive force (hereinafter referred to as BEMF) signal according to the actuator driving; and a resonance frequency correction unit 100 for generating and outputting a drive signal for driving an actuator at a resonance frequency.

Figure 3:
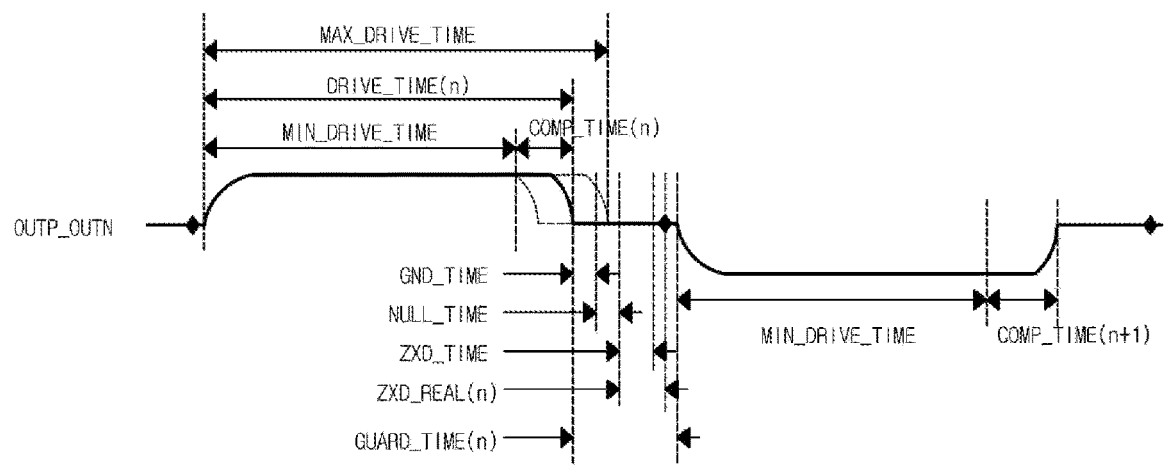
FIGS. 3 and 4 are exemplary views of drive signal waveforms for explaining an embodiment of the present invention.

The resonance frequency correction unit 100, as illustrated in FIG. 3, repeatedly generates and outputs a drive signal including a driving time (DRIVE_TIME) interval for driving the actuator and a guard time (GUARD_TIME) interval for detecting the BEMF signal of the actuator, wherein a drive signal in which the length of the driving time interval is corrected according to the detection time of the zero cross point (ZCP) of the BEMF signal detected within the guard time interval.

Such a resonance frequency correction unit 100 can be configured to comprise:

a memory 110 for storing drive signal waveform data (which can be defined as a reference or initial drive signal waveform) for driving the actuator;

a data correction unit 120 that adjusts the number of data of the drive signal waveform according to the detection time of the zero cross point (ZCP) of the BEMF signal according to the actuator driving; and a PWM generation unit 140 that generates a PWM pulse corresponding to the input internal clock (OSC) and the waveform data of the drive signal whose number of data is adjusted, and outputs it to the actuator drive unit 300.

Of course, the memory 110 and the data correction unit 120 may be implemented as one processor, and such a processor may also be implemented as a processor that controls the overall operation of a device on which the haptic feedback system is mounted.

The resonance frequency correction unit 100 that can be implemented with hardware as well as software logic shortens the driving time interval if the detection time of the zero cross point (ZCP) of the BEMF signal detected in the guard time interval of the drive signal is ahead of the zero cross point detection time of the pre-stored reference value, and generates and outputs a drive signal with an extended driving time interval if it is behind the zero cross point detection time of the reference value.

Furthermore, in order to eliminate residual vibration of the actuator, the resonance frequency correction unit 100 outputs one or more brake signals (BRAKE) in synchronization with the zero cross point (ZCP) of the BEMF signal detected within the guard time (GUARD TIME) interval included in the drive signal, and may also make the brake signals to have different frequencies and sizes. In addition, the resonance frequency correction unit 100 outputs a plurality of brake signals, but it is also possible to repeatedly output the size of one brake signal among the plurality of brake signals by adjusting the size according to a scale down ratio.

Meanwhile, an actuator control device according to an embodiment of the present invention may further include a BEMF amplification unit 400 located at a front end of a zero cross point detection unit 200 to amplify a fine-sized BEMF signal for detecting the zero cross point in the ZCP detection unit.

For reference, in order to accurately detect the zero cross point, it is necessary to distinguish between the BEMF signal and the noise signal. To this end, a noise band is set at the front end of the ZCP detection unit 200 to ignore BEMF signals of less than a certain size. In other words, if the BEMF signal is amplified and two comparators using the low and high threshold voltages from the amplified signal are configured, then the voltage within the threshold band is treated as noise.

Hereinafter, the operation of the actuator control device having the above-described configuration will be described in more detail with reference to the accompanying drawings.

Figure 2:
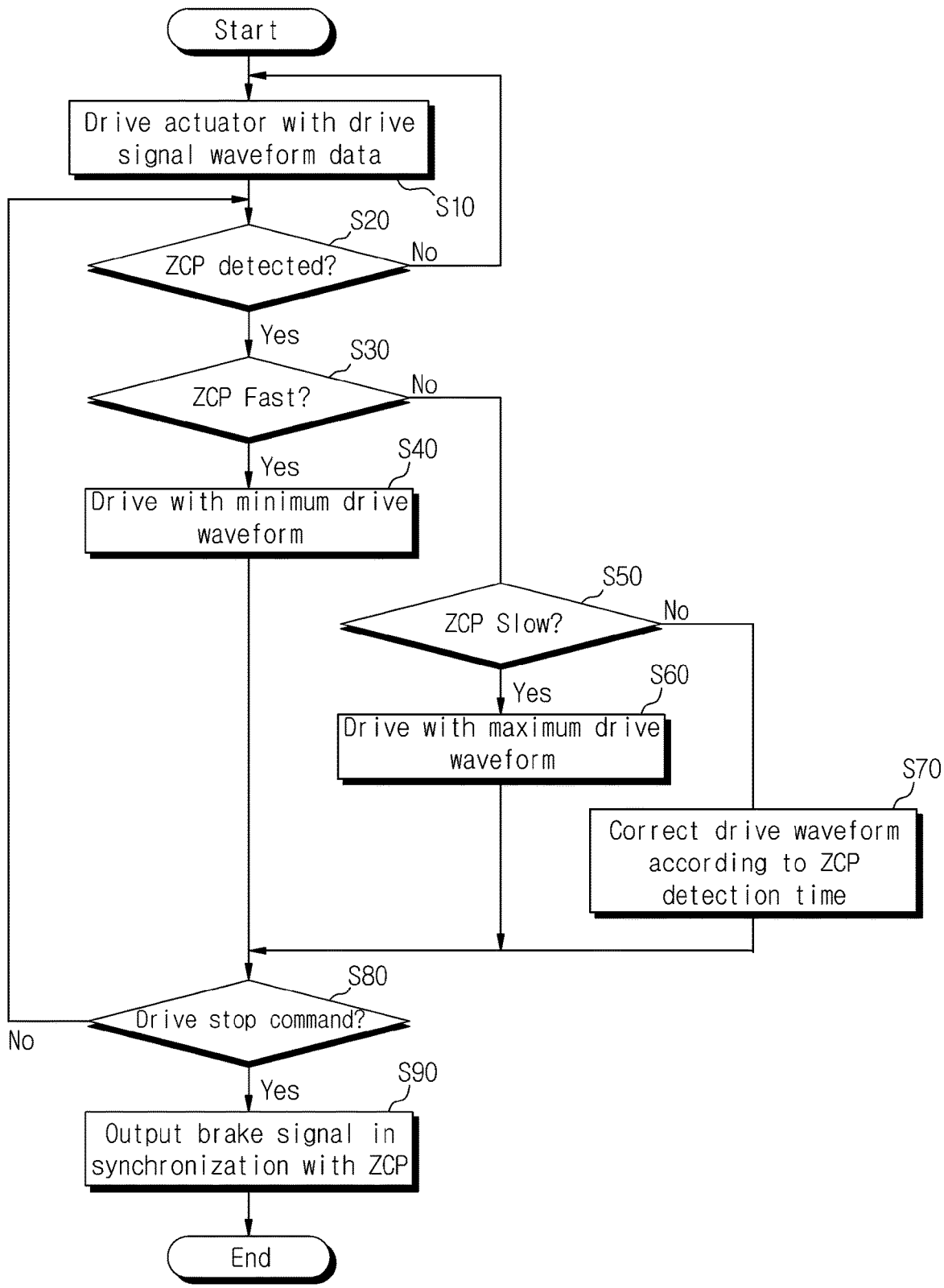
FIG. 2 is a flow chart for explaining an actuator control method according to an embodiment of the present invention.
Figure 4:
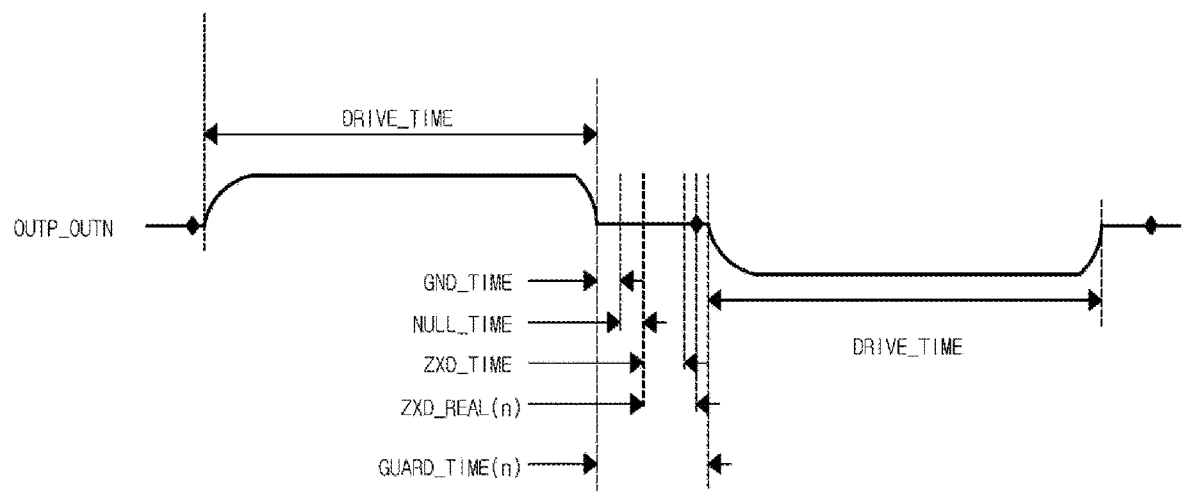

FIG. 2 is a flowchart illustrating an actuator control method according to an embodiment of the present invention; FIGS. 3 and 4 are exemplary diagrams of drive signal waveforms for explaining an embodiment of the present invention; and FIGS. 5 to 7 respectively exemplify brake signal waveforms for explaining an embodiment of the present invention.

Before describing the embodiments of the present invention, the technical features of the present invention will be summarized.

First, a drive signal for driving the actuator is generated and outputted in accordance with the reference resonance frequency of the actuator. The drive signal waveform data for generating the drive signal waveform is stored in a memory and used for initial driving. After initial driving, driving of the actuator is paused (meaning the guard time interval) and the zero cross point (ZCP) and polarity (direction information) of the BEMF signal are detected to measure the actual resonance cycle and movement direction of the moving vibrator. When driving the next cycle, it is possible to correct the frequency of the driving waveform constituting the drive signal by calculating the deviation between the expected value and the measured value at the time of zero cross point (ZCP) detection, and by increasing or decreasing the driving waveform of the drive signal stored in the memory.

In this way, if the waveform of the drive signal is matched with the actual resonance frequency and the polarity of the applied voltage is matched to the direction of motion of the vibrator and driven, the maximum vibration force can be obtained with optimal power efficiency.

The actuator control method embodying the above-described technical features is illustrated in FIG. 2.

Referring to FIG. 2, when the resonance frequency correction unit 100 receives an actuator driving command, the actuator is driven with the drive signal waveform data stored in advance in the memory 110 (step S10). In general, the direction of motion of the vibrator is determined in this actuator driving step. The drive signal waveform data contains information on the magnitude of the output signal and determines the duty of the PWM pulse outputted to the actuator drive unit 300.

For reference, the drive signal is composed of a driving time (DRIVE_TIME) interval for applying a voltage to the actuator and a guard time (GUARD_TIME) interval for detecting a BEMF signal, as illustrated in FIG. 3.

The driving time (DRIVE_TIME) interval comprises a minimum driving time (MIN_DRIVE_TIME: stored in the form of drive signal waveform data) previously stored in the memory 110 and a correction time (COMP_TIME) interval in which the driving time changes according to the correction result The initial value of the correction time (COMP_TIME) interval, COMP_TIME(0), is set as a reference zero cross point (ZCP) detection time (ZXD_TIME) and stored in the memory 110.

The guard time (GUARD_TIME) interval is again composed of GND_TIME, NULL_TIME, and ZXD_REAL. The GND_TIME is necessary to remove the residual energy remaining in the actuator, and NULL_TIME is the time wherein the output of the actuator is turned into a Hi-Z state, and the sensing amplifier and ZCP detection unit 200 are in a standby state to detect the BEMF signal. ZXD_REAL represents the time when the BEMF signal actually reaches the zero cross point.

If the waveform of the drive signal for driving the actuator has a time interval configured as shown in FIG. 3, the first driving time (DRIVE_TIME), DRIVE_TIME(0), is the time excluding the initial guard time (GUARD_TIME) from the half cycle of the actuator resonance frequency.

In other words,

DRIVE_TIME(0)=(1/$f_0$)/2−(GND_TIME+NULL_TIME+ZXD_TIME), and a minimum and maximum DRIVE_TIME can be defined as follows.

MAX_DRIVE_TIME=DRIVE_TIME(0)+COMP_TIME(0)

MIN_DRIVE_TIME=DRIVE_TIME(0)−COMP_TIME(0)

COMP_TIME(0)=ZXD_TIME

After the first drive signal is outputted, DRIVE_TIME(1) of the drive signal of the next cycle is determined by compensating the difference between the reference ZXD_TIME and the actual measured ZXD_REAL at DRIVE_TIME(0).

DRIVE_TIME(1)=DRIVE_TIME(0)+[ZXD_REAL(0)−ZXD_TIME]

If the above explanation is defined as a general formula, it is as follows.

DRIVE_TIME($n$+1)=DRIVE_TIME($n$)+[ZXD_REAL($n$)−ZXD_TIME]

DRIVE_TIME(1)=DRIVE_TIME(0)+[ZXD_REAL(0)−ZXD_TIME]

The description above is defined in general terms as follows.

DRIVE_TIME($n$+1)=DRIVE_TIME($n$)+[ZXD_REAL($n$)−ZXD_TIME]

When referring to the contents described above, the actuator can be driven at a resonance frequency if the length of the driving time (DRIVE_TIME(n)) interval (that is, the frequency of the driving waveform) is corrected by detecting the detection time of the zero cross point of the BEMF signal due to the driving of the actuator and using this as a reference value to be compared with the preset zero cross point detection time.

Accordingly, the data correction unit 120 constituting the resonance frequency correction unit 100 generates the drive signal waveform data stored in the memory 110 and outputs it to a PWM generation unit 140, and checks whether a signal indicating detection of the zero cross point is inputted from the ZCP detection unit 200 (step S20).

When a PWM pulse corresponding to the drive signal waveform data stored in the memory 110 is applied to the actuator drive unit 300, the vibrator, which is an actuator, vibrates, and a BEMF signal by the actuator vibration is inputted to the BEMF amplification unit 400.

By setting the noise band, a BEMF signal of a certain size or less is ignored, and a BEMF signal of a certain size or more is inputted to the ZCP detection unit 200, and thereby, the data correction unit 120 may check whether a signal indicating the detection of a zero cross point (ZCP) is inputted in a guard time interval in which actuator driving is temporarily stopped.

If the zero cross point (ZCP) is detected in step S20, the data correction unit 120 checks whether the zero cross point (ZCP) is Fast (step S30). 'Zero cross point Fast' is defined as a case where the zero cross point (ZCP) occurs before the zero cross point detection time (ZXD_TIME) preset as a reference value.

According to this definition, 'ZXD_REAL=0' and 'COMP_TIME=−ZXD_TIME' at the zero cross point (ZCP) Fast, and the driving time interval of the drive signal is reduced to MIN_DRIVE_TIME and it is driven at the maximum resonance frequency (resonance frequency). That is, if the zero cross point (ZCP) is Fast, the data correction unit 120 corrects the length of the driving time interval, and the number of data of the drive signal waveform stored in the memory 110 is adjusted so that the length of the driving time becomes MIN_DRIVE_TIME (this can be defined as a minimum driving waveform) (step S40).

If the zero cross point (ZCP) is Slow (step S50), the data correction unit 120 corrects the length of the driving time interval in a way that the number of data of the drive signal waveform stored in the memory 110 is adjusted so that the length of the driving time becomes MAX_DRIVE_TIME (this can be defined as the maximum driving waveform) (step S60).

For reference, in the present invention, a case in which the zero cross point (ZCP) does not occur until twice the ZXD_TIME is defined as 'zero cross point (ZCP) Slow'. That is, ZXD_REAL=2*ZXD_TIME, and the driving time interval is increased to MAX_DRIVE_TIME, and is driven at the minimum resonance frequency. Accordingly, the data correction unit 120 adjusts the number of data of the drive signal waveform so that the length of the driving time becomes MAX_DRIVE_TIME as described above.

Meanwhile, if the zero cross point (ZCP) is neither Fast nor Slow, the data correction unit 120 adjust the number of data of the stored drive signal waveform according to the zero cross point (ZCP) detection time (ZXD_REAL-ZXD_TIME is calculated)(step S70).

If the actuator momentarily operates out of the resonance frequency range under abnormal conditions, or if an abnormality occurs in the BEMF signal, it is desirable to control in a way that it is vibrated in a range between the set minimum resonance frequency and maximum resonance frequency.

In summary, the data correction unit 120 outputs a drive signal waveform stored in the memory 110 in response to an actuator driving command and sets an output direction. When an actuator drive end command is received, it is terminated, and if not, the zero cross point (ZCP) of the BEMF signal is detected. When the zero cross point (ZCP) is smaller than the set noise band, the same drive signal waveform is repeatedly outputted to drive the actuator or terminate it as it is. If the zero cross point (ZCP) is Fast when the zero cross point (ZCP) is detected, the number of data of the drive signal waveform stored in the memory 110 is adjusted to become MIN_DRIVE_TIME in the opposite direction, and if the zero cross point (ZCP) is Slow, the number of data of the drive signal waveform is adjusted to become MAX_DRIVE_TIME in the opposite direction, and if ZCP is detected within the ZXD_TIME interval, the difference between ZXD_REAL and ZXD_TIME is calculated, and the number of data in the drive signal waveform is adjusted accordingly.

According to the above embodiment, the actuator control device and control method of the present invention initially drives the actuator with a stored drive signal waveform, but because it tracks the resonance frequency of the actuator in a way that the length of the driving time interval of the next cycle is corrected according to the detection time of the zero cross point of the BEMF signal in the guard time interval constituting the drive signal, there is an advantage in that the maximum vibration can be obtained with optimum power efficiency by correcting the resonance frequency of the actuator in real time, which changes according to manufacturing tolerances, mounting conditions, temperature, and aging.

Meanwhile, in the above-described embodiment, a method of correcting the waveform of the drive signal, that is, the length of the driving time interval for tracking the resonance frequency of the actuator has been described, but, as illustrated in FIG. 4, the resonance frequency may be tracked by fixing a driving time interval and synchronizing to a zero cross point (ZCP).

At this time, the data (DRIVE_TIME) of the drive signal waveform stored in the memory 110 may be determined by the following equation.

DRIVE_TIME<$(1/f_0)/2$−(GND_TIME+NULL_TIME+2*ZXD_TIME)

Meanwhile, in the case of tracking the resonance frequency of the actuator by fixing the length of the driving time interval and synchronizing to the zero cross point (ZCP), it has the advantage of being able to track not only a half-period square waveform, but also waveforms having various shapes and sizes according to the resonance frequency. In this case, vibrations of various feelings can be made with the resonance frequency.

A further description will be made of an actuator braking step for quickly removing residual vibration of an actuator after the above-described actuator resonance frequency correction driving step.

Figure 5:
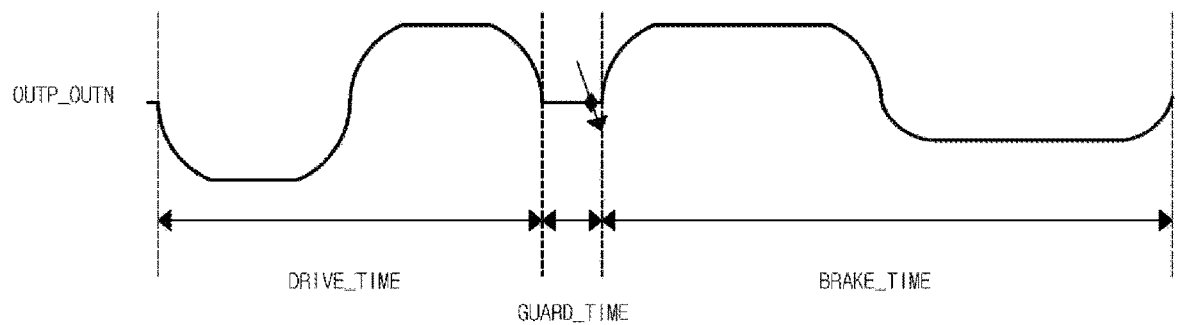
FIGS. 5 to 7 are exemplary views of brake signal waveforms for explaining an embodiment of the present invention.

First, when the data correction unit 120 receives an actuator drive stop command (step S80), as illustrated in FIG. 5 (example of integrated braking waveform), a brake signal waveform (BRAKE_TIME) is outputted (step S90) by synchronizing to the zero cross point (ZCP) of the BEMF signal detected during the guard time (GUARD_TIME) interval in order to remove residual vibration of the actuator after the drive signal waveform (DRIVE_TIME) is terminated. Waveform data of the brake signal can also be stored and used in the memory 110, and as illustrated, the waveform of the brake signal has a waveform in a direction that interferes with the vibration of the actuator.

As mentioned above, by controlling the waveform of the brake signal to be applied to the actuator in synchronization with the zero cross point (ZCP) of the BEMF signal detected during the guard time (GUARD_TIME) interval, the movement of the actuator vibrator can be stopped quickly.

Figure 6:
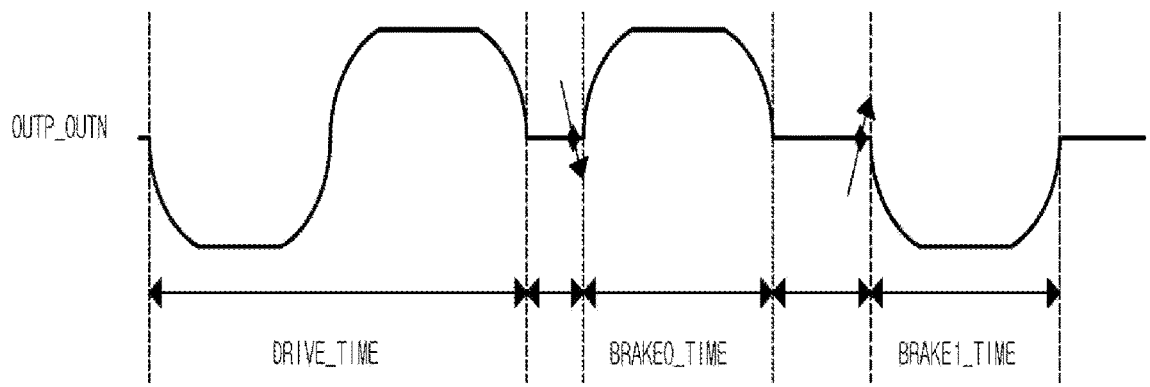

As another implementation method of the above-described actuator braking step, as illustrated in FIG. 6 (example of half-period braking waveform), when the waveform data of the brake signals (BRAKE0_TIME, BRAKE1_TIME, . . . ) having different frequencies and sizes are stored in the memory 110 and synchronized to the zero cross point (ZCP), faster actuator falling time characteristics can be obtained in various ways.

Figure 7:
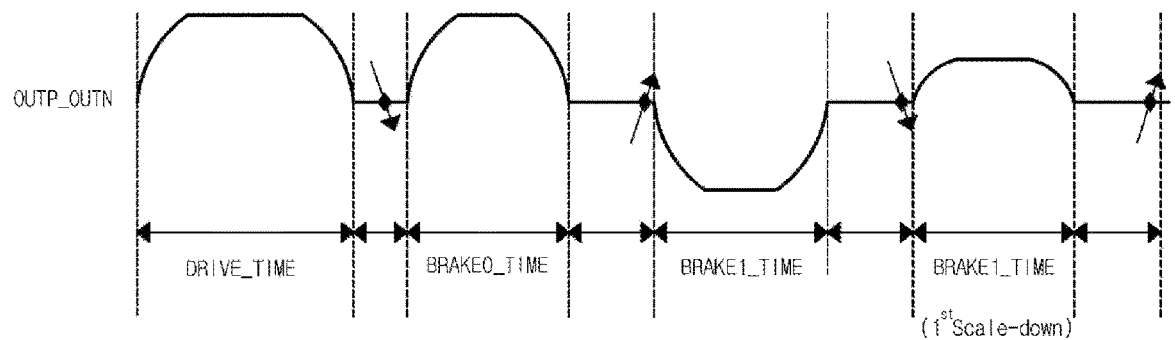

In addition, to prevent the actuator from vibrating again by the brake signal, as illustrated in FIG. 7 (an example of a half-period automatic size adjusting braking waveform), a plurality of brake signals is outputted in a way that the size of one brake signal among the plurality of brake signals may be adjusted according to a scale down ratio to be repeatedly outputted. In FIG. 7, the size of BRAKE1_TIME is scaled down, and the scale down ratio can be selected (for example, 1.0, 0.75, 0.5, 0.25, and the like) according to the falling time characteristic of the actuator.

According to the embodiment of the present invention as described above, the actuator control device and method according to the embodiment of the present invention, since frequencies are adjusted and used after storing waveform data of a drive signal in the memory 110 various waveforms can be driven at a resonance frequency to realize various feelings of vibration, and the effect of adjusting the maximum acceleration and minimizing the dispersion of the actuator acceleration can also be obtained by optimizing the waveform data of the drive signal stored in the memory 110.

In addition, after finding the waveform of the brake signal optimized for the actuator by an experimental method and storing it in the memory 110, there is an advantage that residual vibration can be stably removed even for a waveform with a short driving time or a small size of a BEMF signal such as a home button by applying a brake signal in a direction that interferes with residual vibration according to the zero cross point detected in the section after the actuator is driven.

In the above embodiment, the device and method for correcting the resonance frequency of the actuator by adjusting the number of data of the drive signal waveform applied to the PWM generation unit 140, that is, the drive signal waveform data, have been described, but the resonance frequency of the actuator may be corrected by adjusting the clock frequency applied to the PWM generator 140. Another embodiment of the present invention will be further described, but a description of the same configuration as that already described in FIG. 1 will be omitted.

Figure 8:
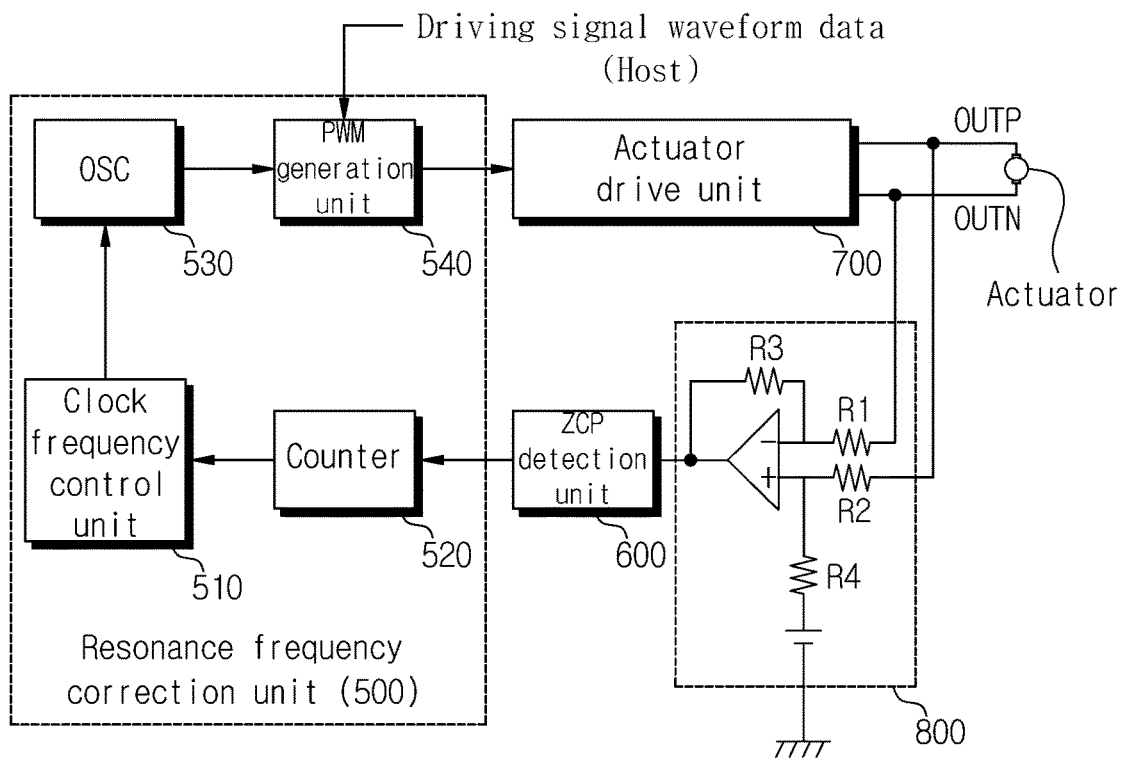
FIG. 8 is an exemplary block diagram of an actuator control device according to another embodiment of the present invention.
Figure 9:
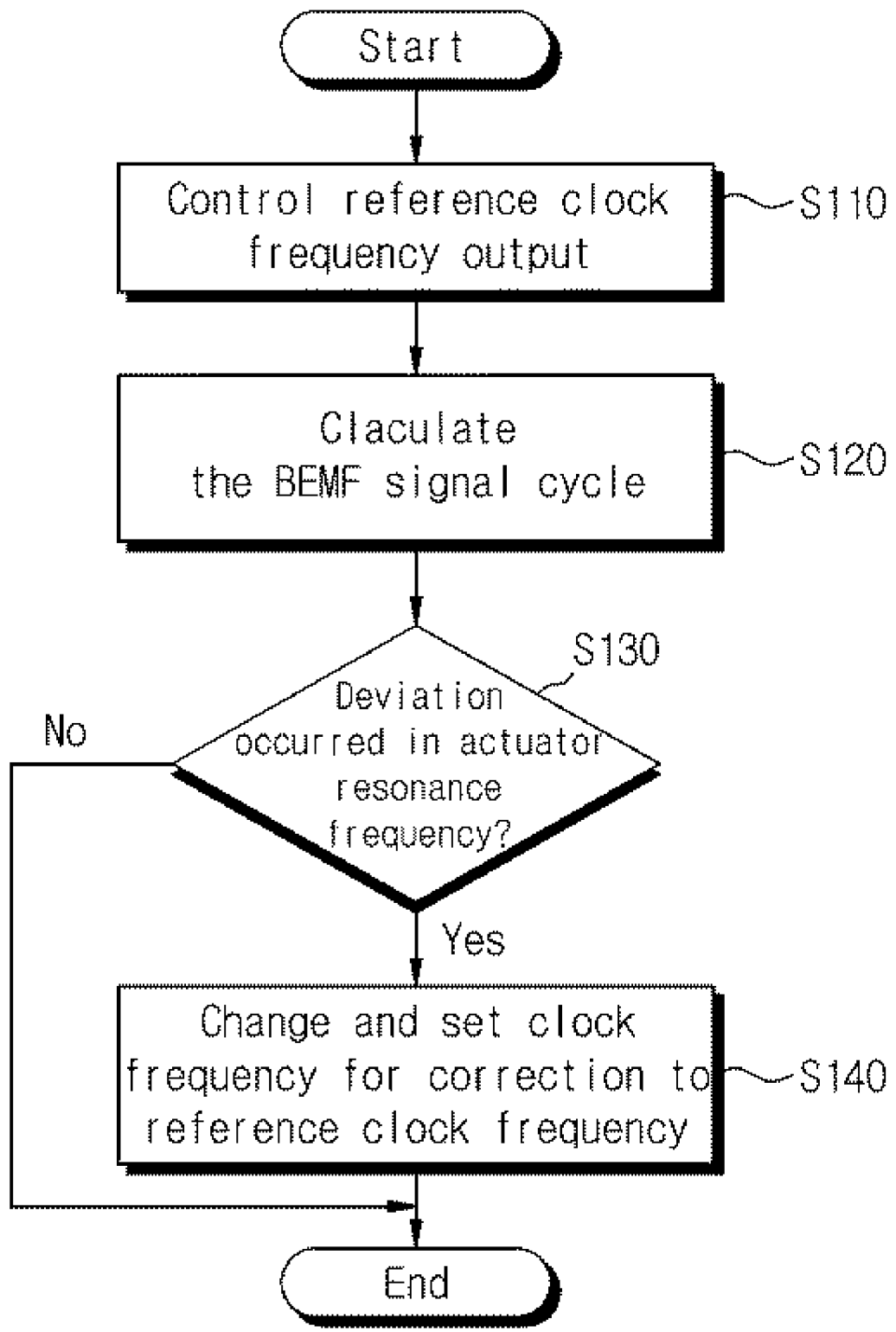
FIG. 9 is an exemplary control flow diagram for explaining a control operation of the actuator control device illustrated in FIG. 8.
Figure 10:
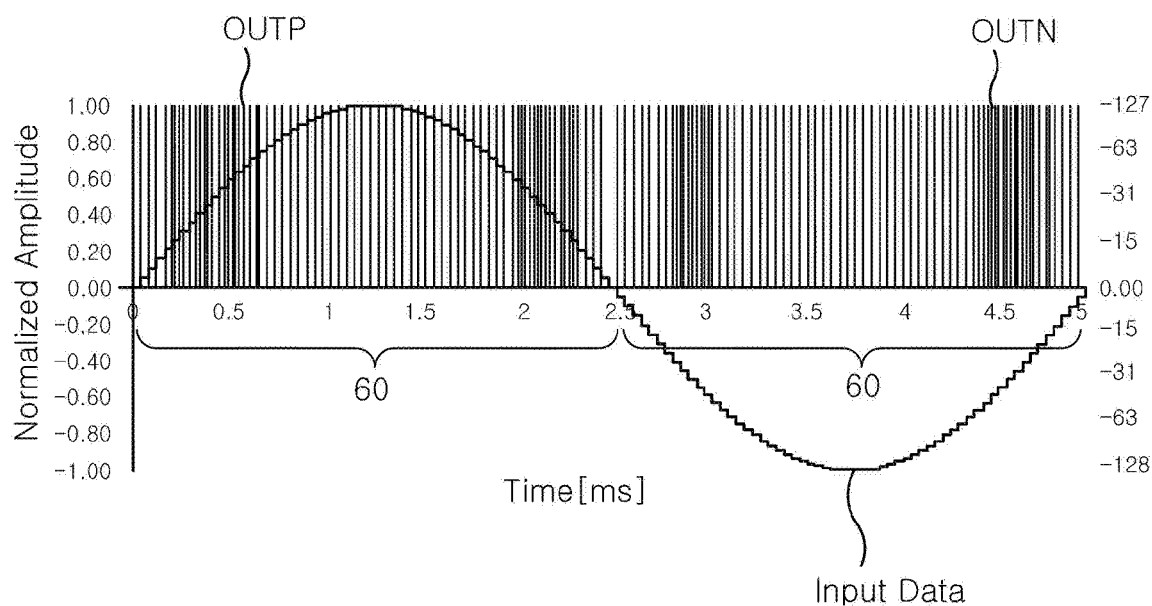
FIG. 10 is an exemplary view of signal waveforms for further explaining the operation of the actuator control device illustrated in FIG. 8.
Figure 11:
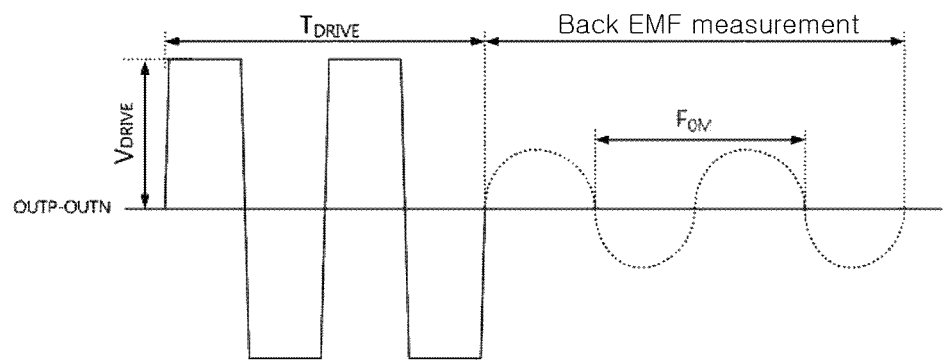
FIGS. 11 and 13 are views for explaining a resonance frequency measurement process according to an embodiment of the present invention.
Figure 13:
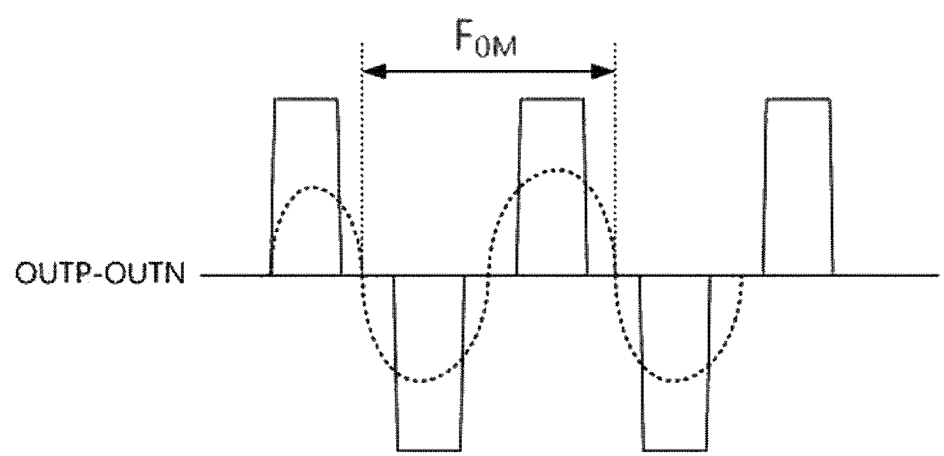

First, FIG. 8 is an exemplary block diagram of an actuator control device according to another embodiment of the present invention, FIG. 9 is an exemplary control flow diagram for explaining a control operation of the actuator control device illustrated in FIG. 8, FIG. 10 is an exemplary view of signal waveforms for further explaining the operation of the actuator control device illustrated in FIG. 8, and FIGS. 11 and 13 are diagrams each illustrating a procedure for measuring a resonance frequency according to an embodiment of the present invention.

FIG. 8 is an exemplary block diagram of an actuator control device according to another embodiment of the present invention.

FIG. 9 is an exemplary control flow diagram for explaining a control operation of the actuator control device illustrated in FIG. 8.

FIG. 10 is an exemplary view of signal waveforms for further explaining the operation of the actuator control device illustrated in FIG. 8.

FIGS. 11 and 13 are views for explaining a resonance frequency measurement process according to an embodiment of the present invention.

As illustrated in FIG. 8, an actuator control device according to another embodiment of the present invention, which is a device for controlling an actuator constituting a haptic feedback system, comprises:

a resonance frequency correction unit 500 that outputs a PWM pulse generated according to the combination of the clock oscillated in an oscillator 530 at a reference clock frequency and the reference driving signal waveform data for driving the actuator to the actuator drive unit; and a zero cross point detection unit 600 for detecting a zero cross point (ZCP) of the BEMF signal according to the actuator driving, wherein the resonance frequency correction unit 500 is characterized by performing an automatic correction process in which the resonance frequency of the actuator is calculated from the zero cross point (ZCP) detection cycle so as to newly change and set the clock frequency for following the calculated current resonance frequency to the reference clock frequency.

The 'reference clock frequency' and the 'reference driving signal waveform data' will be defined as clock frequency and driving signal waveform data set in advance to drive the actuator at a resonance frequency, respectively. This reference clock frequency is newly changed and set by an automatic correction process, which will be described later. The automatic correction process is defined as a series of processes for correcting the resonance frequency of the actuator.

As already described in FIG. 1, the actuator control device illustrated in FIG. 8 may further include a BEMF amplification unit 800 for amplifying a BEMF signal by being positioned at a front end of the zero cross point (ZCP) detection unit 600.

Meanwhile, the resonance frequency correction unit 500 comprises:

a counter 520 for counting the zero cross point (ZCP) detection cycle with an internal clock;

a clock frequency control unit 510 for controlling an output clock of the oscillator 530 by calculating the resonance frequency of the actuator from the counting value of the counter 520, calculating a clock frequency required to follow the calculated resonance frequency of the actuator, and changing and setting it to a new reference clock frequency;

an oscillator 530 oscillating at a clock frequency set by the control of the clock frequency control unit 510; and a PWM generation unit 540 that generates a PWM pulse according to a combination of a clock by the oscillator 530 and a driving signal waveform data applied from the outside.

The 'outside' may be a host processor of a device to which a haptic feedback system is applied, the clock frequency control unit 510 can also act as a main body authorizing a first driving signal waveform data or a second driving signal waveform data for the automatic correction process depending on the implementation method. Of course, when the clock frequency control unit 510 and the counter 520 are implemented as one processor, it may be operated as a coordinating main agent of the driving signal waveform data described in FIG. 1, and it could even be programmed to be operated as a main agent that changes and sets the reference clock frequency, or as a main agent that changes and sets any one of the reference clock frequency and the driving signal waveform data according to an operation mode.

Meanwhile, the clock frequency control unit 510 performs the defined automatic correction process when a predetermined event condition is satisfied. The predetermined event condition is when the device to which the haptic feedback system is applied is powered on, or when it reaches the set temperature in the device that is set in consideration of the specified correction cycle (cycle set by the device user or manufacturer) or the temperature that may cause performance degradation, and the like are few examples. This is only an example, and various types of event conditions may be set by users, manufacturers, and the like.

Figure 12:
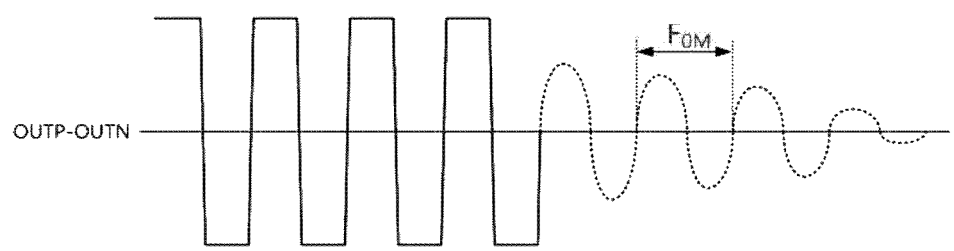

As another variant implementation method, the clock frequency control unit 510 performs the automatic correction process when a predetermined event condition is satisfied, but it is also possible to perform the same calibration process by applying a first driving signal waveform data for correction having a relatively larger driving voltage and shorter driving time than the reference driving signal waveform data (as shown in FIG. 11), or a second driving signal waveform data for correction having a relatively small driving voltage and a longer driving time than the reference driving signal waveform data (as shown in FIG. 12) to the PWM generation unit 540.

Meanwhile, if the resonance frequency correction unit 500 of the actuator control device according to an embodiment of the present invention corrects the resonance frequency by simply changing the clock frequency, the automatic correction process may be limited. To this end, a device processor (host) may further be included for supporting the automatic correction process by the resonance frequency correction unit 500 to be normally performed when a predetermined event condition is satisfied, that is, for applying a first or a second driving signal waveform data for correction.

Hereinafter, a control method of the actuator control device including the above-described configuration will be described in more detail with reference to FIG. 9.

First, when the predetermined event condition defined above is satisfied (may also be performed according to a command of a host, which is a device processor), the clock frequency control unit 510 controls the output of the oscillator 530 (step S110) so that the clock required to generate a drive signal for driving the actuator is oscillated at the reference clock frequency. At this time, the host, which is the device processor, applies the reference driving signal waveform data to the PWM generation unit 540, so that the actuator is driven at a preset resonance frequency of the actuator.

As such, when a driving signal is applied to the actuator, accordingly, a BEMF signal is generated and applied to the ZCP detection unit 600 so that a zero cross point (ZCP) is detected, and a corresponding pulse is applied to the resonance frequency correction unit 500.

Accordingly, the counter 520 in the resonance frequency correction unit 500 counts the cycle of the BEMF signal with an internal clock, and the value is transferred to the clock frequency control unit 510, and thereby the clock frequency control unit 510 calculates the current resonance frequency of the actuator from the BEMF signal cycle according to the actuator drive (step S120).

The resonance frequency can be calculated using the following equations. In the following equations, each of $F_{OM}$, A, and $F_{OSC}$ indicates the calculated resonance frequency, number of counting, and internal clock frequency of the actuator, and N represents the resolution of the driving signal waveform data. Each of $F_0$, $F_{OUT}$, $F_{OSCCAL}$, and $F_{PWM}$ indicates the resonance frequency of the actuator, the resonance frequency of the actuator that has been corrected, the clock frequency for correcting the resonance frequency of the actuator (corresponding to the reference frequency newly changed and set to the corrected clock frequency), and PWM pulse frequency.

$$F_{OM}=F_{OSC}/A \quad \text{[Equation 1]}$$

$$F_{OSCCAL}=F_{OSC}*(F_{OM}/F_0) \quad \text{[Equation 2]}$$

$$F_{OUT}=F_{PWM}/N=F_{OSC}/(N*\text{Resolution of Driving signal waveform data}) \quad \text{[Equation 3]}$$

If the current resonance frequency of the actuator is calculated based on the above equations, the clock frequency control unit 510 proceeds to step S130 to check whether a deviation occurs between the calculated resonance frequency of the actuator and the previously set resonance frequency. If there is a deviation between the resonance frequencies as a result of the check, the current resonance frequency of the actuator has been changed due to various factors such as deterioration, and therefore, the clock frequency to follow the newly calculated current resonance frequency of the actuator (means correction of deviation) is calculated and this is newly changed and set to the reference clock frequency (step S140).

In this way, by newly changing and setting the previously stored reference clock frequency to a clock frequency that can follow the currently measured resonant frequency of the actuator, the actuator can exhibit the maximum vibration characteristics with optimal power efficiency.

Therefore, the present invention corrects the resonant frequency of the actuator, which changes according to manufacturing tolerances, mounting conditions, temperature, and aging, when a predetermined event condition is satisfied through correction of the reference clock frequency, and thus, there is an advantage in that the haptic feedback system can be provided with maximum vibration with optimum power efficiency.

Meanwhile, as another implementation method of the present invention, in order to obtain sufficient vibration force and the magnitude of a measurable BEMF signal under a short driving condition that must be driven within 10 ms to 20 ms, such as vibration of the home button, it is preferred that a driving signal as illustrated in FIG. 11 is applied to the actuator. That is, in order to correct the resonance frequency of the actuator when the home button vibration event occurs, it is desirable for the clock frequency control unit 510 or the host, which is a device processor, to calculate the resonance frequency by applying the first driving signal waveform data having a relatively large driving voltage and a shorter driving time than the reference driving signal waveform data to the PWM generation unit 540.

On the contrary, as illustrated in FIG. 12, the driving time and driving voltage for sufficiently moving the actuator, that is, the second driving signal waveform data for correction having a relatively small driving voltage and a longer driving time than the reference driving signal, may be applied to a PWM generation unit 540 to calculate the resonance frequency.

In addition, as shown in FIG. 13, even when the notification is vibrated for a long time but driven with a small amplitude, since sufficient vibration force and measurable BEMF signal can be obtained after a certain period of time, and it is also possible to change the reference clock frequency by stopping the driving signal in the middle of the notification vibration cycle to measure the BEMF signal cycle with an internal clock, thereby measuring the resonant frequency of the actuator.

The above has been described with reference to the embodiments illustrated in the drawings, but these are merely exemplary, and a person of ordinary skill in the art will understand that various modifications and other equivalent embodiments are possible therefrom.

What is claimed is:

1. An actuator control device comprising:
    a resonance frequency correction unit that outputs a PWM pulse which is generated according to the combination of: a clock oscillated at a reference clock frequency, and a reference driving signal waveform data for driving the actuator, to an actuator drive unit; and
    a zero cross point detection unit for detecting a zero cross point of a Back Electro Motive Force (BEMF) signal according to driving of the actuator,
    wherein the resonance frequency correction unit performs an automatic correction process by calculating the resonance frequency of the actuator from the detection cycle of the zero cross point so as to newly change and set a clock frequency for following the calculated resonance frequency of the actuator to the reference clock frequency.

2. The actuator control device according to claim 1, further comprising:
    the BEMF amplification unit located at a front end of the zero cross point detection unit to amplify a BEMF signal.

3. The actuator control device according to claim 1, wherein the resonance frequency correction unit comprises:
    a counter for counting a detection cycle of the zero cross point with an internal clock;
    a clock frequency control unit for calculating a resonance frequency of the actuator from a counting value of the counter, calculating a clock frequency for following the calculated resonance frequency of the actuator, changing and setting it to a new reference clock frequency, and controlling an output clock of an oscillator;
    an oscillator for oscillating at a clock frequency set by the control of the clock frequency control unit; and
    a PWM generation unit for generating a PWM pulse according to a combination of: a clock of the oscillator, and the waveform data of the driving signal applied from the outside.

4. The actuator control device according to claim 3, wherein the clock frequency control unit performs the automatic correction process when a predetermined event condition is satisfied.

5. The actuator control device according to claim 3, wherein the clock frequency control unit performs the automatic correction process when a predetermined event condition is satisfied, by applying a first driving signal waveform data for correction having a relatively large driving voltage and a shorter driving time than the reference driving signal waveform data, or a second driving signal waveform data for correction having a relatively small driving voltage and a longer driving time than the reference driving signal waveform data, to the PWM generation unit.

6. The actuator control device according to claim 1, wherein the resonance frequency correction unit performs the automatic correction process when a predetermined event condition is satisfied.

7. The actuator control device according to claim 1, further comprising:
a device processor for supporting the automatic correction process by the resonance frequency correction unit to be normally performed when a predetermined event condition is satisfied,
wherein the device processor, when a predetermined event condition is satisfied, applies a first driving signal waveform data for correction having a relatively large driving voltage and a shorter driving time than the reference driving signal waveform data, or a second driving signal waveform data for correction having a relatively small driving voltage and a longer driving time than the reference driving signal waveform data, to the PWM generation unit.

8. The actuator control device according to claim 2, wherein the resonance frequency correction unit comprises:
a counter for counting a detection cycle of the zero cross point with an internal clock;
a clock frequency control unit for calculating a resonance frequency of the actuator from a counting value of the counter, calculating a clock frequency for following the calculated resonance frequency of the actuator, changing and setting it to a new reference clock frequency, and controlling an output clock of an oscillator;
an oscillator for oscillating at a clock frequency set by the control of the clock frequency control unit; and
a PWM generation unit for generating a PWM pulse according to a combination of: a clock of the oscillator, and the waveform data of the driving signal applied from the outside.

9. The actuator control device according to claim 2, wherein the resonance frequency correction unit performs the automatic correction process when a predetermined event condition is satisfied.

10. The actuator control device according to claim 2, further comprising:
a device processor for supporting the automatic correction process by the resonance frequency correction unit to be normally performed when a predetermined event condition is satisfied,
wherein the device processor, when a predetermined event condition is satisfied, applies a first driving signal waveform data for correction having a relatively large driving voltage and a shorter driving time than the reference driving signal waveform data, or a second driving signal waveform data for correction having a relatively small driving voltage and a longer driving time than the reference driving signal waveform data, to the PWM generation unit.

11. An actuator control method, which is a control method for driving an actuator constituting a heptic feedback system at a resonance frequency, comprising:
a first step of controlling an output of an oscillator so that a clock required to generate a driving signal for driving the actuator is oscillated at a reference clock frequency;
a second step of calculating the resonance frequency of the actuator from the cycle of the BEMF signal according to the driving of the actuator; and
a third step of controlling the output of the oscillator by calculating a clock frequency for following the calculated resonance frequency of the actuator and newly changing and setting it to the reference clock frequency.

12. The actuator control method according to claim 11, wherein the second step and the third step are performed when the device is powered on or at a predetermined correction cycle or when a set temperature inside the device is reached.

13. The actuator control method according to claim 11, wherein the second step and the third step are performed when the device is powered on or at a predetermined correction cycle or when a set temperature inside the device is reached, but to further include a step of changing driving signal waveform data so as to generate a first driving signal for correction having a relatively larger driving voltage and shorter driving time than the driving signal or a second driving signal for correction having a relatively small driving voltage and a longer driving time than the driving signal.

14. The actuator control method according to claim 11, wherein the second step and the third step are performed in the middle of a notification vibration cycle.

* * * * *